United States Patent [19]

Chen

Best Available Copy

[11] E Re. 30,855

[45] Reissued Jan. 26, 1982

[54] POWDER METAL COMPOSITION

[75] Inventor: Yew-Tsung Chen, Trumbull, Conn.

[73] Assignee: Pitney Bowes Inc., Stamford, Conn.

[21] Appl. No.: 236,481

[22] Filed: Feb. 20, 1981

Related U.S. Patent Documents

Reissue of:

[64] Patent No.: 4,170,474
Issued: Oct. 9, 1979
Appl. No.: 953,361
Filed: Oct. 23, 1978

[51] Int. Cl.[3] ..... C22C 33/02; C22C 38/42; C22C 38/44

[52] U.S. Cl. ..... 75/251; 75/231; 75/246; 75/252

[58] Field of Search ..... 75/251, 252, 246, 231

[56] References Cited

U.S. PATENT DOCUMENTS

| | | | |
|---|---|---|---|
| 2,853,767 | 9/1958 | Burkhammer | 75/251 |
| 3,787,205 | 1/1974 | Church | 75/226 |
| 3,837,845 | 9/1974 | Church | 75/125 |
| 4,049,429 | 9/1977 | Donachie | 75/246 |
| 4,069,044 | 1/1978 | Mocarski et al. | 75/251 |
| 4,094,559 | 6/1978 | Slusarski | 308/194 |
| 4,098,608 | 7/1978 | Matty | 75/251 |

FOREIGN PATENT DOCUMENTS

| | | |
|---|---|---|
| 1162702 | 8/1969 | United Kingdom . |
| 1378844 | 12/1974 | United Kingdom . |
| 1532641 | 11/1978 | United Kingdom . |
| 1541006 | 2/1979 | United Kingdom . |

*Primary Examiner*—W. Stallard
*Attorney, Agent, or Firm*—Melvin J. Scolnick; William D. Soltow, Jr.; Albert W. Scribner

[57] ABSTRACT

A powder metal composition containing 1.0–2.5% Ni, 0.3–0.7% Mo, 0.15–0.30% Mn, 0.5–1.5% Cu, 0.3–0.7% C, 0.50–1.0% zinc stearate, the balance being Fe.

6 Claims, No Drawings

POWDER METAL COMPOSITION

Matter enclosed in heavy brackets [ ] appears in the original patent but forms no part of this reissue specification; matter printed in italics indicates the additions made by reissue.

BACKGROUND OF THE INVENTION

Many commercial powder metals are available for fabrication of metal parts by compacting, sintering, and heat treating. One of the more frequently used and readily available metal powders is manufactured and marketed by Hoeganaes Corp. under the trade name Ancorsteel 4600V. Although this metal powder when used in the fabrication of parts has shown good results, it has certain shortcomings which would be advantageous to eliminate. The specific composition of Ancorsteel 4600V is 1.8 Ni, 0.25 Mn, 0.5 Mo and the balance being Fe. This composition with appropriate amounts of carbon and zinc stearate will hereinafter be referred to as the known composition. It has been found that using this composition results in too much shrinkage during the sintering stage and the parts are generally difficult to machine. Obviously, it would be advantageous if these shortcomings could be eliminated without sacrificing the generally high strength and ductility possessed in parts made from such a metal powder composition.

SUMMARY OF THE INVENTION

It has been found unusually advantageous to add a small quantity of copper to the known composition when metal parts are to be fabricated. Including the small quantity of copper to the known composition has not only resulted in better machinability and reduction of shrinkage, but surprisingly has yielded higher tensile strengths and higher toughness. The known composition with a small amount of copper will hereinafter be referred to as the disclosed composition.

DESCRIPTION OF PREFERRED EMBODIMENTS

It has been found that adding 0.5–1.5% copper to known mixtures of 1.0–2.5% Ni, 0.15–0.30% Mn, 0.3–0.7% Mo, 0.3–0.7% C and 0.5–1.0% zinc stearate, the balance being iron, has resulted in a metal powder which, when compacted, sintered and heat treated, results in a metal part having unusually good properties. This is particularly true of the metal part that results from the sintering stage. As is known, it is advantageous to have a sintered piece with high strength as the same may be subjected to stresses during the heat treat stage.

In adding the copper to the known composition, it was found that the tensile strength increased after heat treating, the fracture toughness increased after heat treating and the machineability was substantially improved. In regard to machineability, it was found that drill bits used to machine the heat treated products made in accordance with this invention lasted from 50–100% longer.

EXAMPLE

A composition was prepared having the following ingredients:

| Material | | Amount |
|---|---|---|
| Copper | | 0.82% |
| 150 RXM | | |
| Glidden Metals Corp. | | |
| Graphite | | 0.55% |
| Grade 1651 | | |
| Southwestern Graphite Co. | | |
| Zinc Stearate | | 0.75% |
| Zinc Stearate PM | | |
| Penick Corp. | | |
| Pre-Alloyed Powder | Ni | 1.8% |
| Ancorsteel 4600 v | Mo | 0.6% |
| Hoeganaes Corp. | Mn | 0.25% |
| | Fe | Balance |

A 1.25"×0.5"×0.25" transverse rupture bar was compacted at 50 psi and sintered at 2050° F. for 15–30 minutes, with a dew point of 35° F.–55° F. and under endothermic atmosphere. There was only 0.0006" shrinkage in length. After carbonitriding at 1550° F. for 30 minutes, the base was oil quenched and tempered at 350° F. for one hour. There was only 0.0008" expansion.

In addition to maintaining stable dimensions, high strength and toughness was also achieved.

A number of samples of the above dimension from both the known and the disclosed compositions were made in processes similar to the Example given as stated in Example I. In one series of tests the percentages of components as stated in the Example were kept constant and the amount of copper was varied from 0.77 to 1.22%. In another series of tests the percentages of components were kept constant as stated in the Example and the carbon content was varied from 0.35 to 0.55%. All such samples were found to give superior results, similar to those found with samples resulting from the Example.

The samples resulting from the Example were found to have a transverse rupture strength of approximately 160,000 psi after sintering and a transverse rupture strength of approximately 200,000 psi after heat treating for the disclosed composition. This compares with a transverse rupture strength of approximately 141,000 psi for the known composition in the sintered condition and approximately 196,000 psi in the heat treated condition. The disclosed composition was found to have a fractured toughness as sintered of approximately 21,000 psi-in$^{\frac{1}{2}}$ and 23,000 psi-in$^{\frac{1}{2}}$ in the heat treated condition. This compares with the known composition having an as sintered fractured toughness of approximately 21,000 psi-in$^{\frac{1}{2}}$ both in the sintered and heat treated condition.

With respect to machineability, a test was run wherein a drill bit with a load of 24 lbs. was applied to the above samples and rotated at a speed of 1,000 RPM. These loads were applied to samples which had a thickness of approximately ¼". For the disclosed material it was found that approximately 11 seconds were required to drill through a sample and for the standard material approximately 15 seconds were required. Even more significant was that the drill bit showed considerably more wear after drilling through the standard material than it did after drilling through the disclosed material.

The tensile strength of samples made from the disclosed composition was measured at 81,000 psi sintered and 125,000 psi heat treated whereas samples made from the known composition were found to be 75,000 psi and 110,000 psi respectively.

As a consequence, it has been found that substantially better results are achieved in making parts using the known composition when 0.5–1.5% of copper is added as disclosed. These findings have been unexpected as one would not expect the increased physical properties that have been discovered.

What is claimed is:

1. A powder metal composition comprising:

1.0–2.5% Ni, 0.3–0.7 Mo, 0.15–0.30 Mn, 0.5–1.5% Cu, 0.3–0.7 C, 0.50–1.0% zinc stearate, the balance being Fe.

2. The composition of claim 1 wherein said amount of Ni is 1.8%, said amount of Mo 0.6%, said amount of Mn is 0.25%, said amount of C is 0.6%, and said amount of zinc stearate is 0.75%.

3. The composition of claim 2 wherein said amount of Cu is 0.82%.

*4. A sintered powder metal composition comprising 1.0–2.5% Ni, 0.3–0.7% Mo, 0.15–0.30% Mn, 0.5–1.5% Cu, 0.3–0.7% C, the balance being Fe.*

*5. A method for improving the tensile strength, fractured toughness, machineability and dimension stability of a sintered powder metal composition, said composition including 1.0–2.5% Ni, 0.3–0.7% Mo, 0.15–0.30% Mn, 0.3–0.7% C, the balance being Fe, comprising adding to said powder metal composition copper in an amount from 0.5–1.5%.*

*6. A method according to claim 5 further comprising adding 0.50–1.0% zinc stearate to said composition.*

* * * * *